(12) United States Patent
Whelan et al.

(10) Patent No.: US 9,195,504 B2
(45) Date of Patent: Nov. 24, 2015

(54) TRANSFER OF DATA STRUCTURES IN SUB-LINEAR TIME FOR SYSTEMS WITH TRANSFER STATE AWARENESS

(75) Inventors: John Staehle Whelan, White Bear Lake, MN (US); Mark Ludwig, Minneapolis, MN (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1461 days.

(21) Appl. No.: 12/563,614

(22) Filed: Sep. 21, 2009

(65) Prior Publication Data

US 2011/0072032 A1    Mar. 24, 2011

(51) Int. Cl.
  *G06F 9/50*    (2006.01)
(52) U.S. Cl.
  CPC .................................. *G06F 9/5011* (2013.01)
(58) Field of Classification Search
  CPC ....................................................... G06F 9/5011
  USPC .......... 707/736, 756, 764, 791, 803, E17.009, 707/E17.05, E17.076, 999.101
  See application file for complete search history.

(56) References Cited

U.S. PATENT DOCUMENTS

| | | | |
|---|---|---|---|
| 6,898,639 B2 | 5/2005 | Muramatsu | |
| 7,506,075 B1 | 3/2009 | Armstrong et al. | |
| 2007/0043874 A1 | 2/2007 | Nath | |
| 2007/0288484 A1 | 12/2007 | Chen | |
| 2009/0019425 A1* | 1/2009 | Archambault et al. | 717/120 |
| 2009/0222691 A1* | 9/2009 | Riemers | 714/18 |
| 2009/0271528 A1* | 10/2009 | Gurevich et al. | 709/247 |
| 2011/0264831 A1 | 10/2011 | Whelan et al. | |

FOREIGN PATENT DOCUMENTS

| | | | |
|---|---|---|---|
| WO | WO 0072532 A1 | 11/2000 | |
| WO | WO 2005122532 A1 | 12/2005 | |

OTHER PUBLICATIONS http://en.wikipedia.org/wiki/Recursion_(computer_science).*
http://en.wikipedia.org/wiki/Recursion_(computer_science) retrieved on Apr. 5, 2012.*
Anonymous; Wikipedia; Retrieved from the Internet: URL: http://en.wikipedia.org/w/index.php?title+BitTorrent_(protocol) &oldid=31516632; Book; 2009 (16 pages).
PCT International Search Report dated Apr. 5, 2011 corresponding to PCT Application No. PCT/US2010/049650 filed Sep. 21, 2010 (13 pages).

(Continued)

*Primary Examiner* — James Trujillo
*Assistant Examiner* — Hubert Cheung

(57) ABSTRACT

A method for data transfer in a data processing system, and corresponding system and machine-readable medium. One method includes receiving by the data processing system a request for a data structure from a calling process, and splitting the data structure into a plurality of substructures by the data processing system. That method includes transferring the plurality of substructures to the calling process by the data processing system, wherein at least two of the substructures are transferred in parallel, and maintaining a transfer state for each substructure in the data processing system.

20 Claims, 4 Drawing Sheets

(56) References Cited

OTHER PUBLICATIONS

PCT International Search Report dated Jul. 12, 2011 corresponding to PCT Application No. PCT/US2011/03828 filed Apr. 18, 2011 (11 pages).

Skordoulis, et al. IEEE 802.11 N MAC frame Aggregation Mechanisms for Next-Generation High-Throughput WLANS IEEE Wireless Communications vol. 14, No. 1 Feb. 2008 pp. 40-47.
Makineni, et al. Receive Side Coalescing for Accelerating TCP/IP Processing, High Performance Computing—HIPC 2006 Lecture Notes in Computer Science Jan. 1, 2006 pp. 289-300.

* cited by examiner

TRANSFER OF DATA STRUCTURES IN SUB-LINEAR TIME FOR SYSTEMS WITH TRANSFER STATE AWARENESS

TECHNICAL FIELD

The present disclosure is directed, in general, to data transfer and, more specifically, to efficient transfer of large data structures.

BACKGROUND OF THE DISCLOSURE

Transferring large data structures or large blocks of structured data can be time consuming and act as a bottleneck to efficient data processing.

SUMMARY OF THE DISCLOSURE

A method for data transfer in a data processing system, and corresponding system and machine-readable medium. One method includes receiving by the data processing system a request for a data structure from a calling process, and splitting the data structure into a plurality of substructures by the data processing system. That method includes transferring the plurality of substructures to the calling process by the data processing system, wherein at least two of the substructures are transferred in parallel, and maintaining a transfer state for each substructure in the data processing system.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Transferring large data structures or large blocks of structured data between applications or systems is a problem that is currently solved in linear or greater time relative to the size of the structure being transferred. As data structures become larger, these time limits become bottlenecks to timely sharing of data. Additionally, the consumption of resources for transferring a structure, including CPU cycles and memory, grows in a linear or greater manner relative to the size of the structure being transferred, and is restricted to operating on a single computer. The restriction of resources to a single computer produces a limitation to the ability to support the processing of arbitrary large data structures due to upper limits to the size of a computer.

Disclosed embodiments provide a system and method for transferring data between differing processes or applications executing on a single system or on multiple interconnected data processing systems, each having one or more processors.

Figure 1:
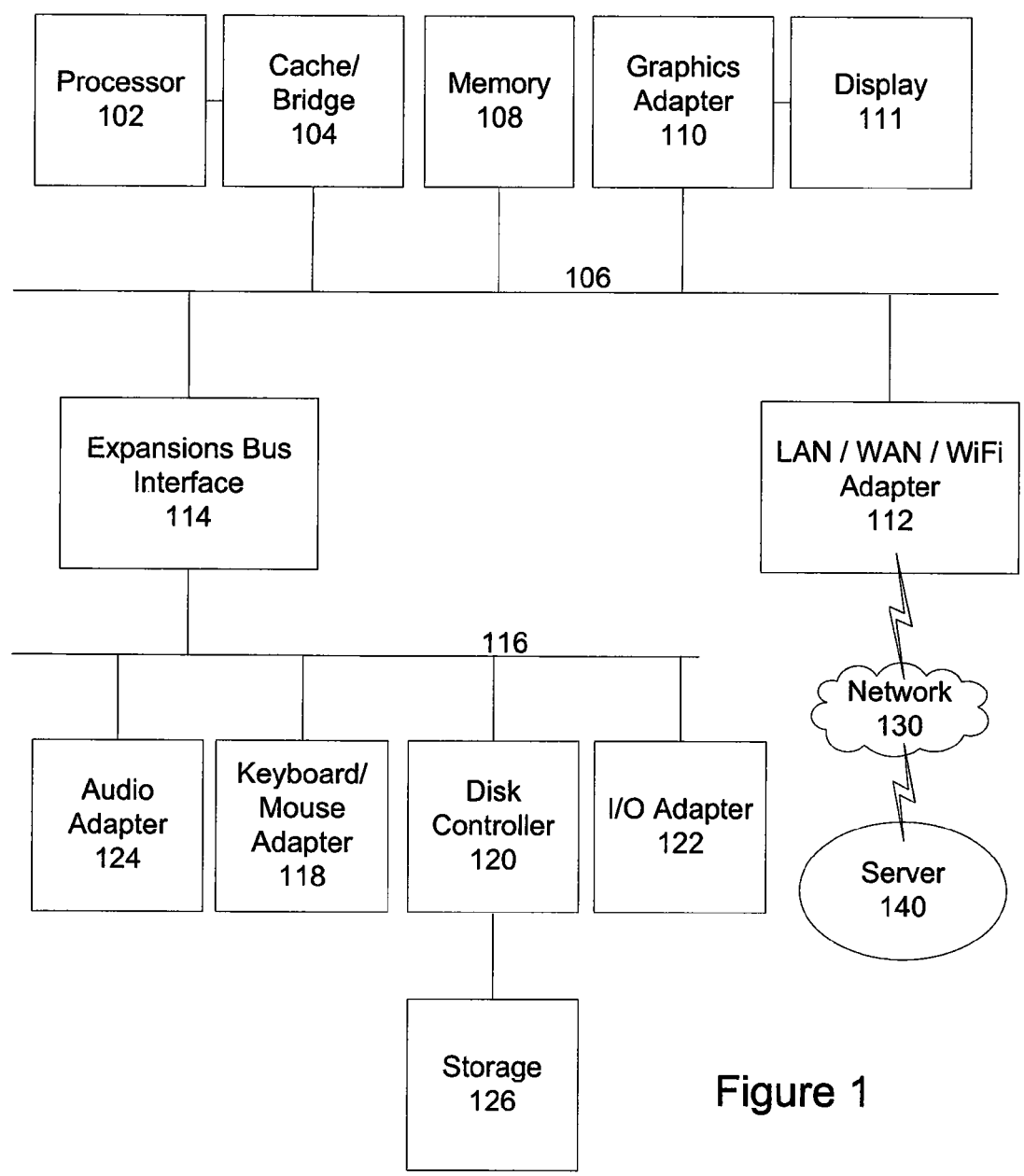
FIG. 1 depicts a block diagram of a data processing system in which an embodiment can be implemented.

FIG. 1 depicts a block diagram of a data processing system in which an embodiment can be implemented, as any of the systems operating on data structures as described herein. The data processing system depicted includes one or more processors such as a processor 102 connected to a level two cache/bridge 104, which is connected in turn to a local system bus 106. Note that although only one processor 102 is shown in this diagram for simplicity, various embodiments explicitly include multiple processors. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100. Various embodiments described herein can include the data transfers between multiple data processing systems over a network 130, each of the data processing systems implemented as a data processing system 100.

Organizations with large quantities of structured data wish to share data both internally and externally. Often, the sharing of data needs to be accomplished in a specific amount of time. The ability to share data faster provides a significant technical advantage and significant business advantages to an organization.

Various embodiments include a system and method for splitting individual transfers of structured data into multiple sub-requests that can run independently in parallel, in order to achieve support of transfer of arbitrary size and in sub-linear time. This approach provides significant improvements to systems such as enterprise information management systems, by enabling the system to remember what data has been transferred ("transfer state awareness"), and to transfer portions of data containing only the data that has not been sent.

The disclosed embodiments include adding additional steps to a data transfer. These include analyzing the structure being transferred, and recursively subdividing the structure into transfers of bounded-size subsets of the structure for which non-dependent sub-structures can be transferred in parallel. This approach allows the work to be horizontally scaled across an arbitrary number of processors, and to have transfers completed in logarithmic time (given sufficient processors).

Figure 2:
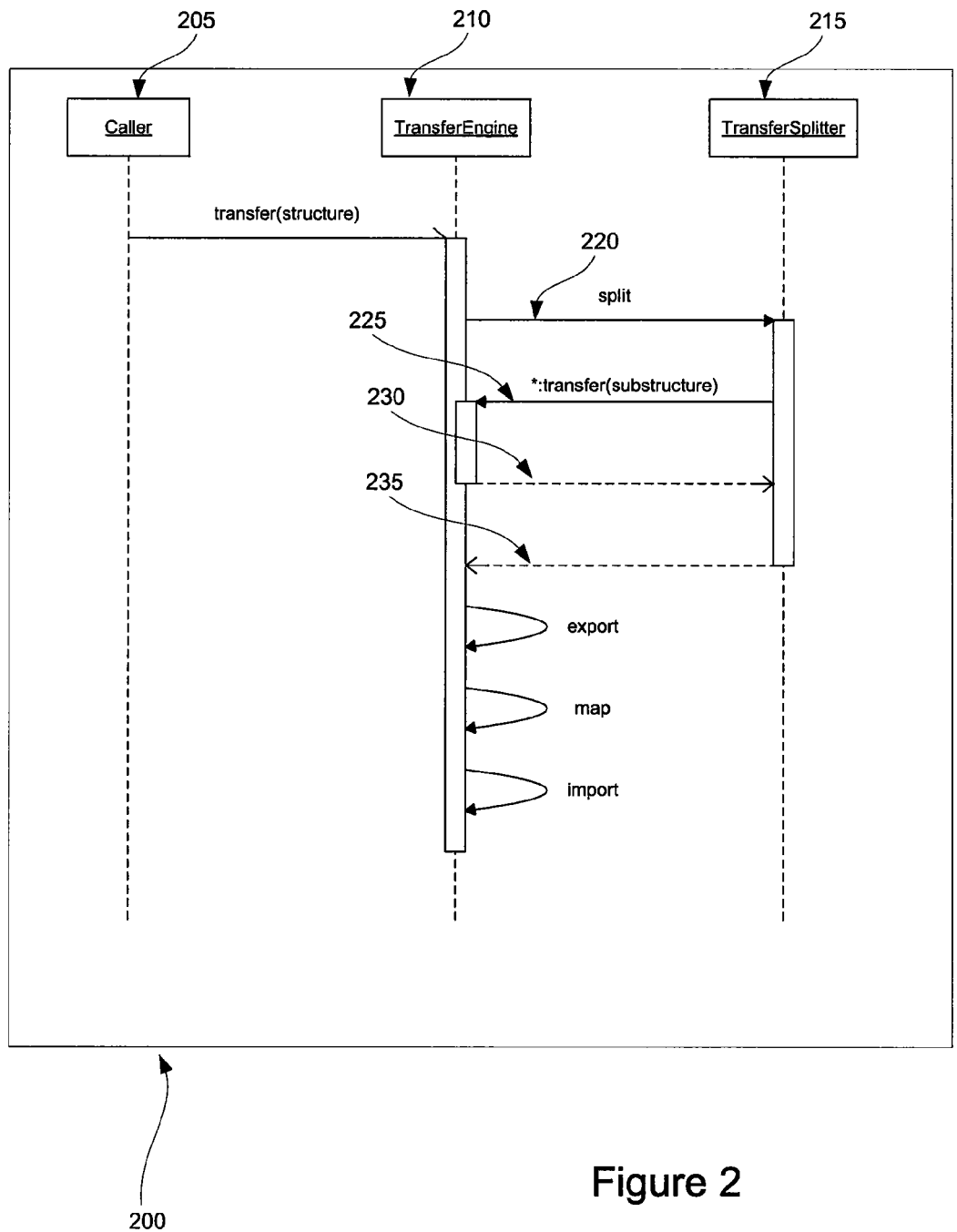
FIG. 2 illustrates a data transfer process as performed by a data processing system in accordance with disclosed embodiments.

FIG. 2 illustrates a data transfer process as performed by a data processing system 200 in accordance with disclosed embodiments. As shown here, data processing system 200 responds to a data request from caller 205 by invoking multiple instances of a transfer engine 210 and invoking a transfer splitter 215. Data processing system 200 also maintains a transfer state awareness for the portions of the data being transferred. Data processing system 200 can be implemented, for example, as a data processing system 100.

This figure illustrates the recursive nature of the disclosed process. The caller 205 requests data. TransferEngine 210 calls the TransferSplitter 215 at 220, which splits the requested data structure into multiple substructures. Substructures are identified in the split actions, and are sent for processing as separate calls to other instances of TransferEngine 205 at 225, where there may be multiple calls 225. Upon completion of the calls for each substructure, as indicated at 230, the parent structure is then processed in a recursive manner at 235.

The actual transfer of the various substructures can be performed in a conventional manner, with the addition of maintaining transfer state awareness.

Figure 3:
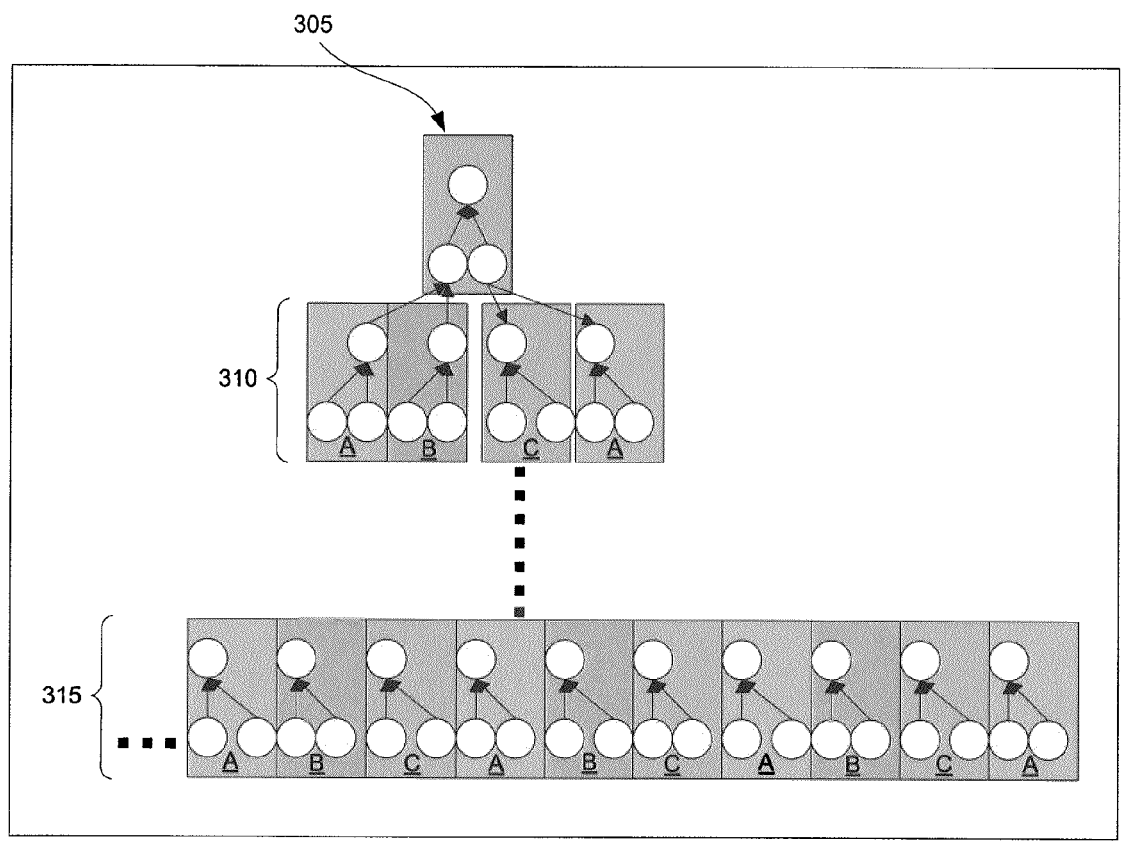
FIG. 3 illustrates an example of data structure splitting in accordance with disclosed embodiments.

FIG. 3 illustrates an example of data structure splitting in accordance with disclosed embodiments. Structure 305 is the starting element, and is shown with a three subelements. In this particular case, the structure 305 is being split into four substructures 310, each with a size of three. Each of these substructures can be recursively broken down further into substructures 315.

Each of the substructures can be assigned to a specific TransferEngine instance that processes a specific subset of the structure. In this example, there are three TransferEngine instances designated A, B, and C used to transfer the structure. Each of the corresponding structures and substructures in FIG. 3 is illustrated with an A, B, or C label showing the TransferEngine instance to which it is assigned. Since the TransferEngine instances transfer the substructures in parallel, each set of three A, B, and C substructures can be transferred at roughly the same time, rather than in a serial manner if the entire structure were transferred at once by a single transfer process as in conventional systems.

Adding more TransferEngine instances will decrease the amount of time needed to transfer a structure, with a lower limit being related to the depth of a structure.

Following is pseudo-code of a process that can be used for structure splitting in accordance with some embodiments:

```
Transfer.process (TransferRequest x) {
    // holds onto the request until the time is should run.
    SchedulingService.process(x);
    // splits off subparts of the transfer to other transfers
    Integer transactionSize = 1000;
    SplittingService.process(x, transactionSize);
    // The "normal" steps...
    ExportContents ec = ExportService.process(x);
    MappedContents mc = MappingService.process(ec, x);
    ImportContents ic = ImportService.process(mc, x);
    ConfirmExportService.process(ic, x);
{
SplittingService.process (TransferRequest x, Integer transactionSize) {
    PDMObject rootObj = getRootObject(x);
    // traverse down the structure until you reach a size of transactionSize
    PDMObject leftObjs[ ] = { rootObj};
```

-continued

```
        Integer totalSize = 1;
        Do {
            leftObjs = BackEndSystem.setExpand( leftObjs,
    "RelationshipName" );
            totalSize = totalSize + leftObjs.size;
        } While ( totalSize < transactionSize )
        For Each (obj: leftObjs) {
            // generate request for child object
            TransferRequest y = generateTransferRequest(x, obj);
            // RECURSION HERE! (async call with callback)
            TransferBPEL.process(y);
        }
        // wait for all the child transfers to complete.
        Wait(leftObjs);
        Return;
    }
```

The exemplary pseudo-code shows one sample process that can be used for splitting data structures as described herein. The substructures identified by the splitter are transferred in parallel. The recursive nature of the process allows for arbitrary large structures to be processed. The parent structure(s) await completion of the substructures, thus allowing for failures in the sub-transactions to not result in missed data by the parent transfer(s).

Because subsequent steps are being processed as substructures, even though the steps themselves are linear in cost, because they are being run in parallel, they can be processed in sub-linear time. The recursion approach allows independent sub-structures (sub-structures that are not are not ancestor/descendent related) can be run in parallel, while dependent (parent) structures are always run after the lower level structures are completed. This allows the system to avoid redundant traversals and exports for systems that maintain transfer-state awareness (i.e., the system remembers that it already transferred some element's subelement, and does not redundantly re-transfer).

This algorithm will scale to multiple processors, and have an lower wall-clock time limit of WallClockTime=LogX(N)+C, where X is related to the average number children per node, N is the number of nodes in the structure, and C is a constant overhead.

Figure 4:
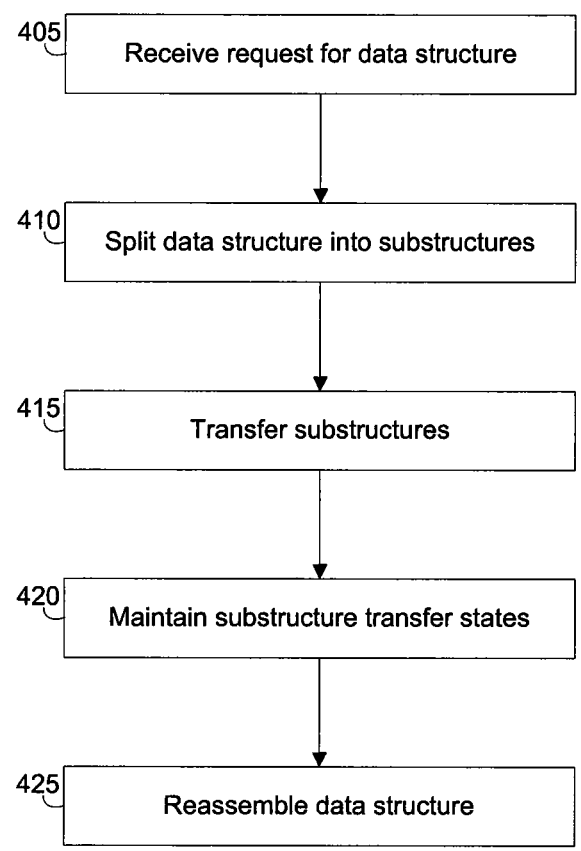
FIG. 4 depicts a process in accordance with disclosed embodiments.

FIG. 4 depicts a process in accordance with disclosed embodiments.

The data processing system receives a request (or call) for a data structure in a transfer engine and from a calling process (step 405).

The data processing system splits the data structure into a plurality of substructures (step 410). Each (child) substructure can have a dependent parent structure or substructure. The splitting process can be performed recursively on each substructure to a selected granularity that can be specified either in number or size of the smallest substructures, or according to the depth of the substructure tree. This step can include calling a transfer splitter engine by the transfer engine.

The data processing system transfers the substructures to the calling process, wherein at least two of the substructures are transferred in parallel (step 415). Preferably, each substructure transferred in parallel is transferred by a separate processor or processor core. This step can include transferring each substructure using an independent transfer engine instance.

The data processing system maintains a record of a transfer state of each of the substructures until the transfer of all substructures is complete (step 420). The transfer state can include states such as transferred, transfer failed, and untransferred. Subsequent substructure transfers can include any substructures having a state of transfer failed or untransferred, but preferably does not include any substructures having a state indicating they have already been transferred. The maintaining step is necessarily performed at the same time as the transferring step.

The calling process optionally re-assembles the data structure from the substructures (step 425).

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for data transfer in a data processing system, comprising:
   receiving by the data processing system a request for a data structure from a calling process;
   splitting the data structure into a plurality of substructures by the data processing system, the plurality of substructures including independent substructures and dependent parent substructures;
   transferring the plurality of substructures to the calling process by the data processing system, wherein at least two of the substructures are transferred in parallel and the dependent parent substructures are transferred after the independent substructures; and
   maintaining a transfer state for each substructure in the data processing system.

2. The method of claim 1, wherein the maintaining step is performed concurrently with the transferring step.

3. The method of claim 1, wherein the transferring step uses an independent instance of a transfer engine for each substructure.

4. The method of claim 1, wherein the splitting is performed recursively to produce substructures of a selected size.

5. The method of claim 1, wherein substructures that are transferred in parallel are each transferred using a different processor of the data processing system.

6. The method of claim 1, wherein the calling process reassembles the data structure from the substructures.

7. The method of claim 1, wherein the state for each substructure indicates whether the substructure has been successfully transferred.

8. A data processing system comprising a plurality of processors and an accessible memory, the data processing system particularly configured to perform the steps of:
   receiving a request for a data structure from a calling process;
   splitting the data structure into a plurality of substructures, the plurality of substructures including independent substructures and dependent parent substructures;
   transferring the plurality of substructures to the calling process, wherein at least two of the substructures are transferred in parallel and the dependent parent substructures are transferred after the independent substructures; and
   maintaining a transfer state for each substructure.

9. The data processing system of claim 8, wherein the maintaining step is performed concurrently with the transferring step.

10. The data processing system of claim 8, wherein the transferring step uses an independent instance of a transfer engine for each substructure.

11. The data processing system of claim 8, wherein the splitting is performed recursively to produce substructures of a selected size.

12. The data processing system of claim 8, wherein substructures that are transferred in parallel are each transferred using a different processor of the data processing system.

13. The data processing system of claim 8, wherein the calling process reassembles the data structure from the substructures.

14. The data processing system of claim 8, wherein the state for each substructure indicates whether the substructure has been successfully transferred.

15. A non-transitory tangible machine-readable medium encoded with computer-executable instructions that, when executed, cause a data processing system to perform the steps of:
   receiving a request for a data structure from a calling process;
   splitting the data structure into a plurality of substructures, the plurality of substructures including independent substructures and dependent parent substructures;
   transferring the plurality of substructures to the calling process, wherein at least two of the substructures are transferred in parallel and the dependent parent substructures are transferred after the independent substructures; and
   maintaining a transfer state for each substructure.

16. The non-transitory machine-readable medium of claim 15, wherein the maintaining step is performed concurrently with the transferring step.

17. The non-transitory machine-readable medium of claim 15, wherein the transferring step uses an independent instance of a transfer engine for each substructure.

18. The non-transitory machine-readable medium of claim 15, wherein the splitting is performed recursively to produce substructures of a selected size.

19. The non-transitory machine-readable medium of claim 15, wherein substructures that are transferred in parallel are each transferred using a different processor of the data processing system.

20. The non-transitory machine-readable medium of claim 15, wherein the state for each substructure indicates whether the substructure has been successfully transferred.

* * * * *